United States Patent
Maher

(10) Patent No.: US 7,908,651 B2
(45) Date of Patent: Mar. 15, 2011

(54) METHOD OF NETWORK COMMUNICATION

(75) Inventor: Thomas Maher, Dublin (IE)

(73) Assignee: Asavie R&D Limited, Dublin (IE)

( * ) Notice: Subject to any disclaimer, the term of this patent is extended or adjusted under 35 U.S.C. 154(b) by 1046 days.

(21) Appl. No.: 11/364,745

(22) Filed: Feb. 28, 2006

(65) Prior Publication Data

US 2007/0002857 A1    Jan. 4, 2007

(30) Foreign Application Priority Data

Jun. 30, 2005   (IE) .................................. S2005/0439

(51) Int. Cl.
    *G06F 9/00*       (2006.01)
    *G06F 15/16*      (2006.01)
    *G06F 17/00*      (2006.01)
    *H04L 29/06*      (2006.01)
(52) U.S. Cl. .............. 726/12; 726/11; 726/14; 713/153; 713/160; 709/227; 709/228
(58) Field of Classification Search .................. 370/389, 370/351, 392, 400, 401, 475; 726/12, 2, 726/3, 4, 11, 13, 14, 15; 709/227, 228, 229, 709/238, 244, 245, 249; 713/154, 160, 162, 713/168, 169, 170, 171
See application file for complete search history.

(56) References Cited

U.S. PATENT DOCUMENTS

| 6,055,236 | A  | * | 4/2000 | Nessett et al. | 370/389 |
|---|---|---|---|---|---|
| 6,563,824 | B1 | * | 5/2003 | Bhatia et al. | 370/392 |
| 6,892,245 | B1 | * | 5/2005 | Crump et al. | 709/245 |
| 7,315,888 | B2 | * | 1/2008 | Shibata | 709/223 |
| 7,787,459 | B2 | * | 8/2010 | Yuan et al. | 370/392 |
| 2002/0133602 | A1 | * | 9/2002 | Godwin et al. | 709/229 |
| 2003/0135616 | A1 | * | 7/2003 | Carrico et al. | 709/225 |
| 2003/0142823 | A1 | * | 7/2003 | Swander et al. | 380/277 |
| 2003/0149899 | A1 | * | 8/2003 | Boden et al. | 713/201 |
| 2003/0154306 | A1 | * | 8/2003 | Perry | 709/245 |
| 2003/0212907 | A1 | * | 11/2003 | Genty et al. | 713/201 |
| 2003/0233475 | A1 | * | 12/2003 | Maufer et al. | 709/245 |
| 2004/0044778 | A1 | * | 3/2004 | Alkhatib et al. | 709/228 |
| 2004/0049585 | A1 | * | 3/2004 | Swander | 709/229 |
| 2004/0078600 | A1 | * | 4/2004 | Nilsen et al. | 713/201 |
| 2004/0088537 | A1 | * | 5/2004 | Swander et al. | 713/153 |

(Continued)

OTHER PUBLICATIONS

T. Mallory and A. Kullberg, Incremental Updating of the Internet Checksum, IETF Network Working Group RFC 1141, Jan. 1990, Defense Advanced Research Projects Agency, Arlington, VA.

(Continued)

*Primary Examiner* — Michael Pyzocha
*Assistant Examiner* — Hilary Branske
(74) *Attorney, Agent, or Firm* — Whiteford, Taylor & Preston LLP; Jeffrey C. Maynard; Gregory M. Stone

(57) ABSTRACT

A method of network communication and a network gateway are disclosed. The method and gateway operate between a secure network and remote clients by way of an intermediate transport network, such as the Internet. The remote clients connect through a NAT router so share a common source address on the intermediate transport network. In the secure network, the method analyses packets received from a remote client to identify packets that start a new secure communication session. Then, the method assigns a session-unique address and port to the new secure communication session. Subsequent packets are translated in the secure communication session by exchanging the source address with the local session address. Thus, the secure network perceived each session as originating from a distinct address and port, whereby several such sessions can coexist simultaneously.

9 Claims, 5 Drawing Sheets

U.S. PATENT DOCUMENTS

| | | | | |
|---|---|---|---|---|
| 2004/0143758 | A1* | 7/2004 | Swander et al. | 713/201 |
| 2004/0203749 | A1* | 10/2004 | Iyer et al. | 455/432.1 |
| 2004/0205245 | A1* | 10/2004 | Le Pennec et al. | 709/245 |
| 2005/0066035 | A1* | 3/2005 | Williams et al. | 709/226 |
| 2005/0125532 | A1* | 6/2005 | Kimchi | 709/225 |
| 2005/0210292 | A1* | 9/2005 | Adams et al. | 713/201 |
| 2005/0216725 | A1* | 9/2005 | Vaarala et al. | 713/151 |
| 2006/0173968 | A1* | 8/2006 | Vaarala et al. | 709/214 |
| 2006/0185010 | A1* | 8/2006 | Sultan | 726/12 |

OTHER PUBLICATIONS

S. Kent and R. Atkinson, IP Encapsulating Security Payload (ESP), IETF Network Working Group RFC 1406, Nov. 1998, Defense Advanced Research Projects Agency, Arlington, VA.

D. Harkins and D. Carrel, The Internet Key Exchange (IKE), IETF Network Working Group RFC 2409, Nov. 1998, Defense Advanced Research Projects Agency, Arlington, VA.

T. Kivinen, B. Swander, A. Huttunen, and V. Volpe, Negotiation of NAT-Traversal in the IKE, IETF Network Working Group RFC 3947, Jan. 2005, Defense Advanced Research Projects Agency, Arlington, VA.

A. Huttunen, B. Swander, V. Volpe, L. DiBurro, and M. Stenberg, UDP Encapsulation of IPsec ESP Packets, IETF Network Working Group RFC 3948, Jan. 2005, Defense Advanced Research Projects Agency, Arlington, VA.

* cited by examiner

METHOD OF NETWORK COMMUNICATION

BACKGROUND OF THE INVENTION

1. Field of the Invention

This invention relates to a method of network communication. In particular, it enables multiple hosts to share a common IP address using NAT while taking advantage of the security offered by IPsec. Most of the abbreviations used in this specification will be familiar to those skilled in the technical field, so their definitions will not be placed into the body of the text; however, a glossary is provided at the end of the description.

2. Background of the Art

It is generally considered that NAT and IPsec are incompatible protocols. This is because UDP encapsulation of IPsec ESP Packets suffers from conflicts in transport mode when multiple clients behind a NAT device want to communicate with the same server. This transport mode conflict creates a one-session behind one-IP-address restriction for remote client access solutions using IPsec/L2TP when L2TP is secured using IPsec transport mode.

Private networks are commonly connected to the public Internet through one or more NAT routers so that hosts on the private network can communicate with hosts on the Internet. For hosts to receive packets from the Internet, hosts require a globally unique 32-bit public IP address. To help preserve the limited public Internet addresses, private networks can allocate IP addresses from address ranges reserved for private networks. Hosts on the private network, when communicating with hosts on the Internet, do so through a NAT router, which is assigned, either statically or dynamically, one or more public IP address. The NAT router enables the hosts in the private network, behind the NAT router, to share the NAT router's public IP addresses when communicating with hosts on the Internet.

Virtual Private Networks (VPNs) provide the ability for remote hosts to communicate with hosts on a private network by means of establishing a secure tunnel over the Internet. One standard method of achieving this is through the use of PPP over L2TP over IPsec.

In the scenario where a remote host is behind a NAT router, the establishment of an IPsec tunnel becomes problematic because there is an intervening device that is modifying the packets. To support IPsec tunnels between devices that are separated by a NAT router, the devices can employ NAT-Traversal (NAT-T) in the negotiation of IKE and subsequently encapsulate IPsec packets in UDP. However, when NAT-T is used in combination with L2TP over IPsec, a transport mode conflict arises when more than one session behind a NAT-router attempts to connect.

Given that one of the primary reasons for the deployment of NAT-routers is to enable a small number of public IP addresses to be shared by a larger number of hosts, this is a considerable disadvantage. It would therefore be desirable to enable the establishment of L2TP over IPsec tunnels by multiple hosts behind a NAT-router.

Methods built-in to a security gateway, where the IPsec tunnel is terminated, can be implemented to solve the transport mode conflict. In practice, built-in solutions are not available.

SUMMARY OF THE INVENTION

An aim of this invention is to provide a method of implementing NAT over a network link secured by transport mode IPsec.

From a first aspect, this invention provides a method of communication over a network link between a secure network and remote clients by way of an intermediate transport network, wherein the remote clients share a common source address on the intermediate transport network; wherein in the secure network, the method comprises: analyzing packets received from a remote client to identify packets that start a new secure communication session; assigning a session-unique address to the new secure communication session; and translating subsequent packets in the secure communication session by exchanging the source address with the local session address.

Thus, within the secure network, each session appears to originate from a separate remote IP address, so multiple sessions can be co-exist without interfering with one another.

The session-unique address typically includes one or both of a local IP address and a local port number. Session-unique addresses are most typically assigned from a private IP address range.

More specifically, packets inbound to the secure network may be translated such that packets of a session inbound to the secure network are modified by changing the source IP address and source port to the assigned IP address and port. Likewise, outbound packets of a session may be modified by changing the destination IP address and destination port to the originating client's IP address.

Typically, correspondences between source addresses and the local session addresses are stored in a mapping table. Such tables may be arranged for rapid access by well-known measures such as hashing.

The secure communication session is most usually a NAT-T IKE session and the type of session so negotiated is most usually IPsec, and more specifically, IPsec transport mode ESP. In such embodiments, an SPI and sequence number in an ESP header of a packet is used to identify a packet as part of an established session.

A session is typically maintained while it is active in transmitting data packets. However, it is highly desirable to dispose of sessions that have ceased to be active. For example, inactive sessions can be maintained and terminated on a variable time basis. In such cases, the variable time may be determined according to the state of the session. Alternatively or additionally, the variable time period is determined by the routing of packets in alternating directions to ensure both peers are alive. As an alternative, inactive sessions may be maintained for a constant timer period. This ensures that a started timer will expire on or after any existing timer, greatly facilitating their maintenance.

In preferred embodiments, a state machine is associated with a new session in order to monitor the state of the session.

From a second aspect, this invention comprises a network gateway device comprising a first network interface for communication with clients on a secure local network and a second network interface for communication with remote clients over a wide-area network, and a processing unit that can transfer data between the first and second network interfaces, wherein the processing unit is operative to transfer packets to implement a method according to the first aspect of the invention.

A gateway device embodying this aspect of the invention may serve as a gateway between a secure network and an insecure wide-area network, such as the Internet.

A gateway device embodying this aspect of the invention may be implemented as a suitably-programmed general-purpose computer or in dedicated hardware.

From a third aspect, this invention provides a computer software product that when executed on a hardware platform performs a method according to the first aspect of the invention.

BRIEF DESCRIPTION OF THE DRAWINGS

An embodiment of the invention will now be described in detail, by way of example, and with reference to the accompanying drawings, in which.

DETAILED DESCRIPTION

Figure 1:
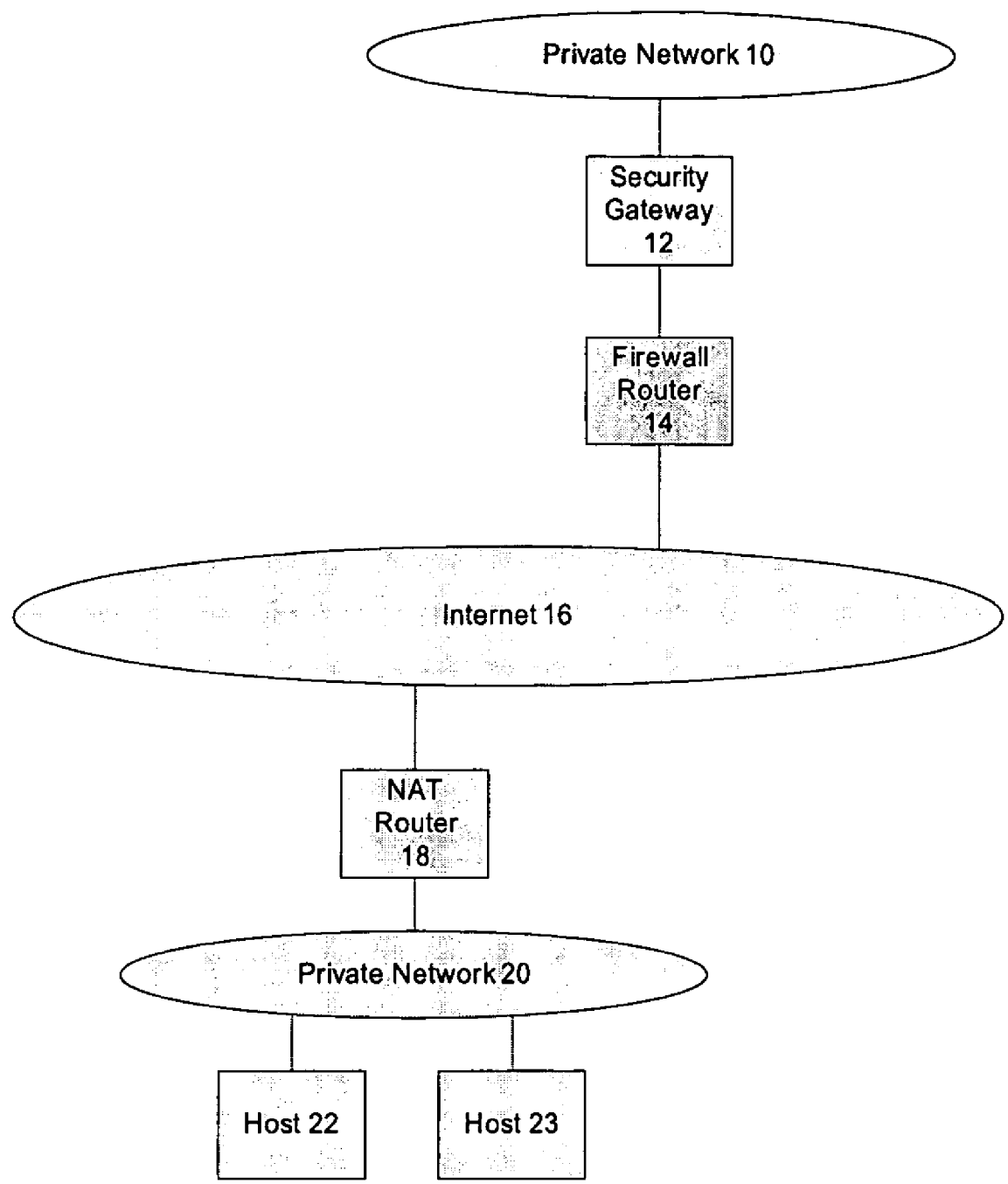
FIG. 1 is a block diagram of a typical (prior art) remote access scenario where clients are behind a NAT router.

FIG. 1 shows a typical remote access scenario in which hosts 22 and 23, have private IP addresses within the private network 20. A NAT router 18 is attached to the Internet 16 with a public IP address and to the private network 20 with a private IP address. Hosts 22 and 23 when accessing the Internet do so through the NAT router 18, which employs NAT to enable hosts 22 and 23 to send packets to and receive packets from Internet hosts.

A private network 10 has a security gateway 12 that is capable of terminating secure VPN tunnels from remote hosts, thus enabling secure remote access to the private network 10. The security gateway 12 is connected to the Internet 16 by an external firewall router 14. The security gateway employs NAT-T capable IKE in combination with L2TP and IPsec thus allowing remote access to clients from behind NAT routers, for example hosts 22 and 23.

However, due to the transport mode conflict, either host 22 or host 23 can connect to the private network 10 through the security gateway 12, but not both simultaneously. Furthermore, if one host (for example host 22) is connected and another host from behind the same NAT router establishes a new connection (for example host 23) the existing connection from host 22 may be lost.

Figure 2:
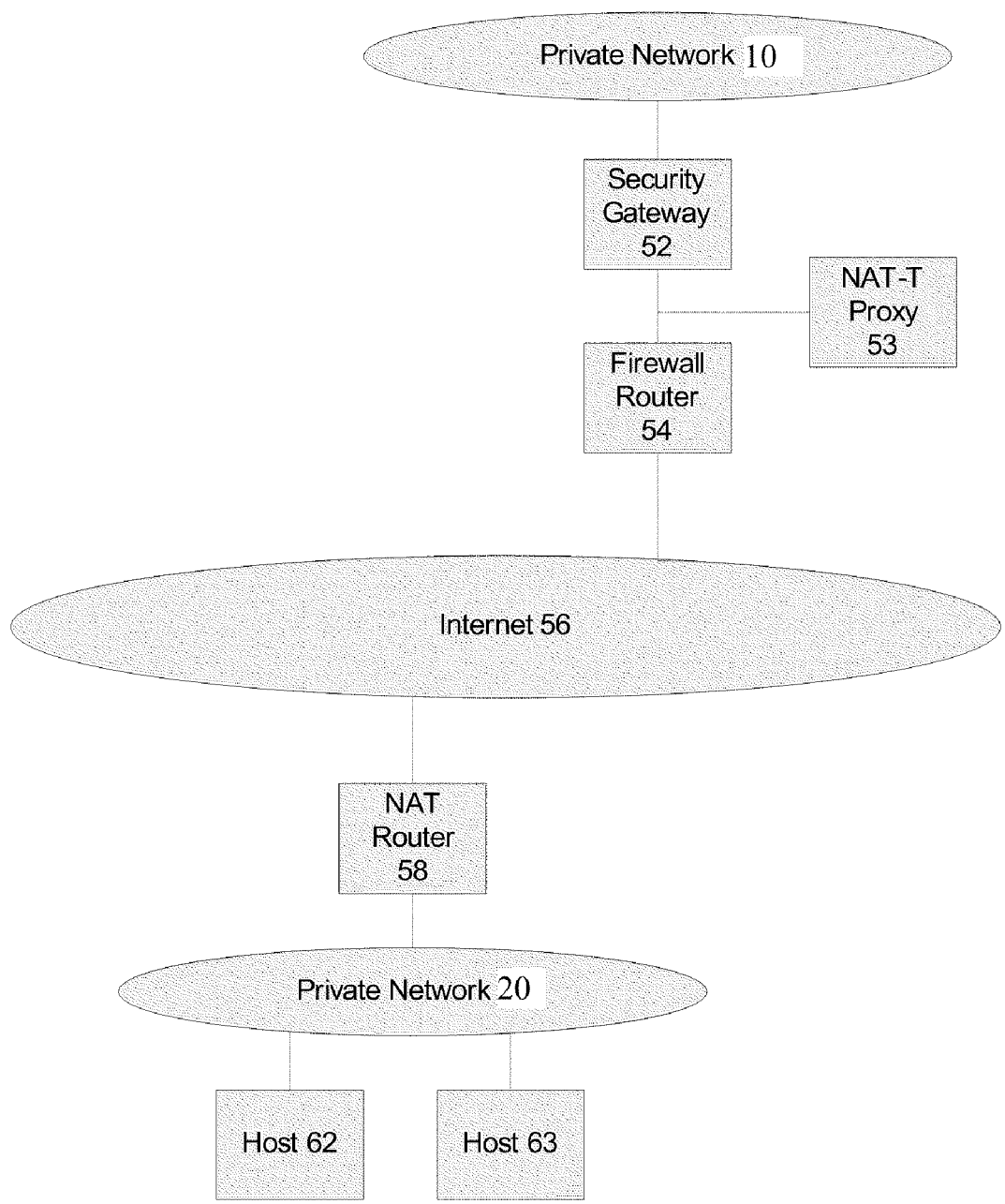
FIG. 2 is a block diagram of a remote access scenario with the addition of a NAT-T proxy, which implements the network address translation system of this invention.

FIG. 2 shows the same remote access scenario as FIG. 1 with the addition of a NAT-T proxy 53 between the firewall router 54 and security gateway 52. In this embodiment, the firewall router is configured to route packets with a destination address of the security gateway 52 through the NAT-T proxy 53. The NAT-proxy 53 examines the packets determining whether the packet is dropped, routed un-altered, or modified to assign to it a unique session IP address. The NAT-T proxy 53 is configured with a private pool of IP addresses to assign to sessions. Modified packets are sent to the security gateway 52, having a source address associated with the session. The security gateway 52 is configured to route packets addressed to the private session IP address pool via the NAT-T proxy 53, where the NAT-T proxy 53 modifies the outbound packet for delivery to the originating client, for example host 62 or 63, via NAT router 58.

The NAT-T proxy 53 can comprise software code executing on a device such as an INTEL based PC. In addition to basic IP routing capabilities, for example as are readily available in a Linux operating system, the NAT-T proxy 53 incorporates the procedures and processing to implement an embodiment of the present invention to track NAT-T IKE sessions and manipulate packets, which are part of these sessions, in accordance to network address and port translations rules disclosed.

The NAT-T proxy 53 includes the basic functionality of a router and operates as a standard router in for packets that fall outside the domain of packets subject to special processing by the embodiment.

The example deployment of the NAT-T proxy 53 in FIG. 2 is one of many possible options. The NAT-proxy 53 can be deployed in any configuration that facilitates packets from the Internet 56 to the security gateway 52 to be routed through the NAT-T proxy 53, and packets from the security gateway 52 to session assigned IP addresses routed through the NAT-T proxy 53.

Processing of packets by the NAT-T proxy will now be described.

The method of the embodiment applies a packet processing algorithm to determine the treatment of each packet forwarded to a NAT-T proxy 53.

Figure 3:
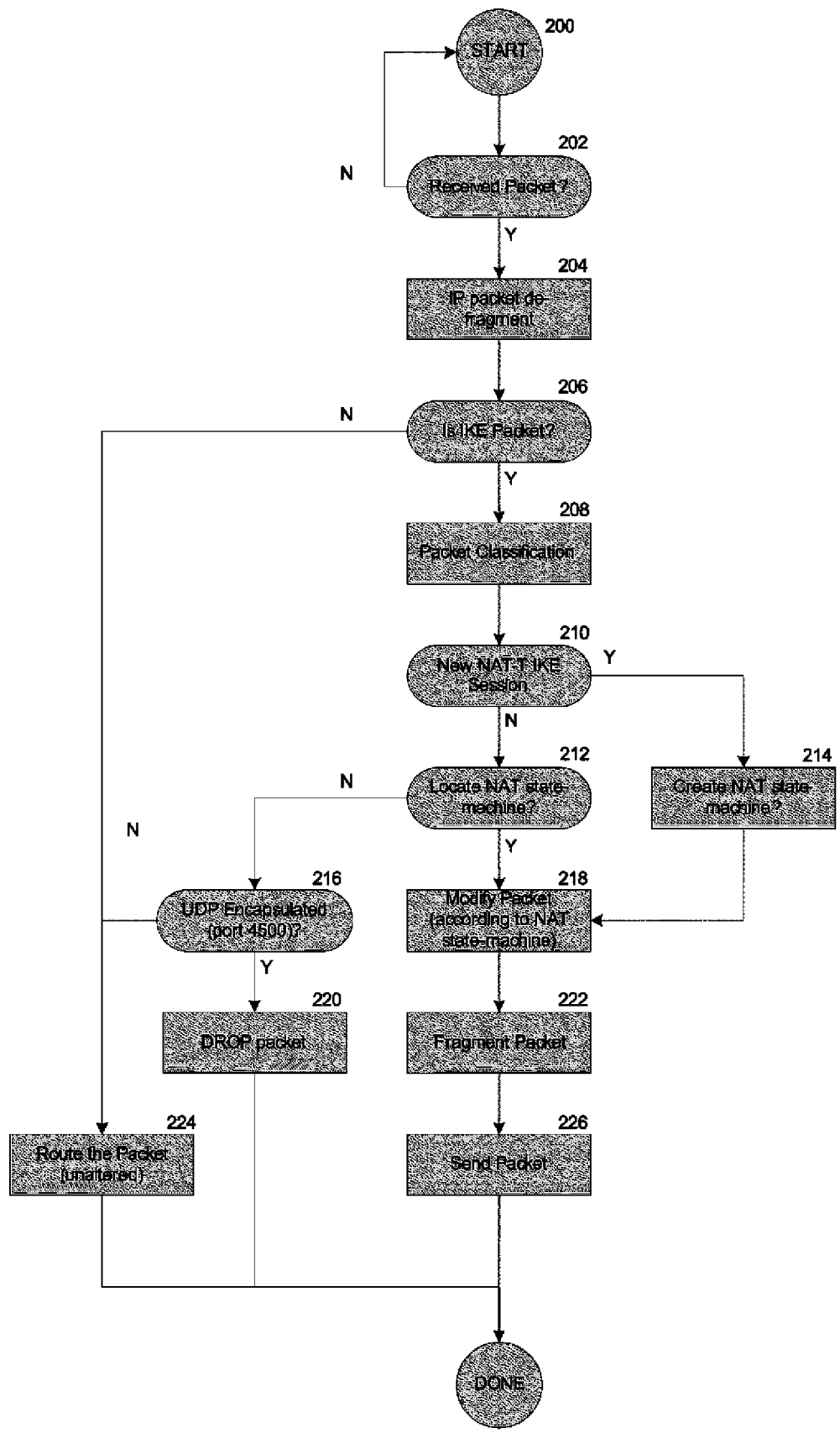
FIG. 3 is a packet processing flow diagram applied within a NAT-T proxy.

FIG. 3 shows the packet process flow of packets that might be applied by an embodiment of the invention. The process starts 200 on a decision point 202 to test whether a packet has been received. If not, the system waits for a packet. If, on the other hand, a packet is received then if the packet is an IP fragment, it is combined 204 with other fragments to form a de-fragmented packet. Complete IP packets are then tested to determine if a packet is an IKE packet 206. An IKE packet is a UDP packet either inbound addressed to (destination IP address) the security gateway 54, or outbound addressed from (source IP address) the security gateway 54, with UDP port associated with IKE (UDP port 500) or UDP port associated with UDP encapsulated ESP (UDP port 4500). If not, the packet is processed according to normal routing 224. If, on the other hand, the packet is an IKE packet, then the packet is classified 208 by examining the octets in the packet. In a next decision point 210, if the packet represents a new NAT-T IKE session, then a NAT state-machine is created to track subsequent packets associated with this new IKE session. Packets that are classified as not being new IKE sessions are subject to a further decision point in which an existing NAT state-machine is located 212. If no NAT state-machine is located, then the packet either will be dropped 220 or routed normally 224 based, respectively, on whether the packet is an encapsulated UDP or not 216. In the case where the packet is either associated with a new NAT state-machine 214 or associated with an existing NAT state-machine 212, the packet is modified 218 according to the address translation information in the NAT state-machine. Packet modification 218 includes the incremental update of checksum fields which employs the technique described in IETF RFC 1141 "Computation of the Internet Checksum via Incremental Update", A. Rijsinghani, May 1994. The packet is then fragmented 222 if necessary and sent 226.

Figures 4, 5:
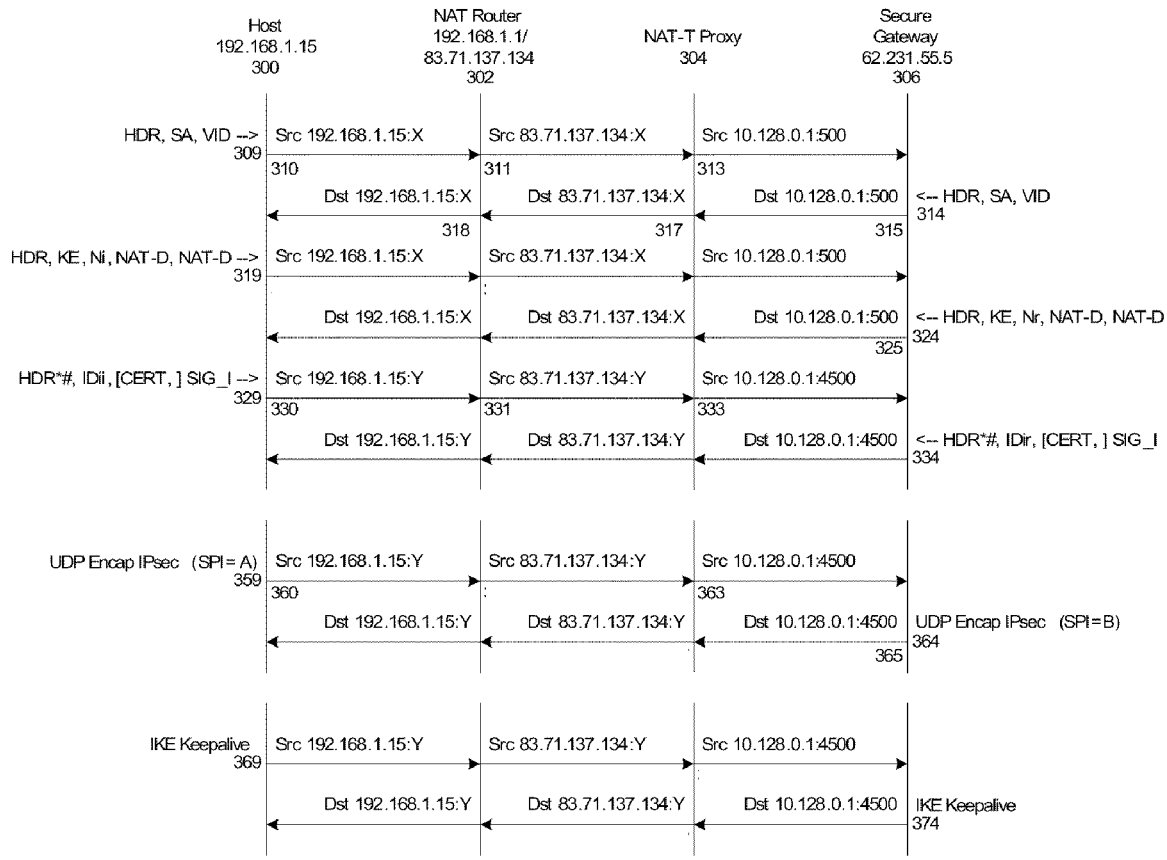
FIG. 4 depicts NAT-T packet exchanges between remote access clients and a security gateway.
FIG. 5 describes the layout of the NAT state-machines maintained by the NAT-T proxy.

In order to assist in describing the behavior of the NAT proxy 53, FIG. 4 shows example packet exchanges in the establishment of and operation of a session. The example shows a host 300 in communication with a secure gateway 306, with NAT router 302 and NAT-T proxy 304 (being the same as NAT-T proxy 53). In accordance with the specification of a NAT-T negotiation in IETF RFC 3947 "Negotiation of NAT-Traversal in the IKE", T. Kivinen, et al., January 2005, host 300, with a private IP address of 192.168.1.15, starts by initiating Phase 1 IKE exchange by sending an ISAKMP message 309, using the IKE notation defined in IETF RFC 2409 "The Internet Key Exchange (IKE)", D. Harkins, et al., November 1998., "HDR, SA, VID". The ISAKMP message is sent as a packet 310 in a UDP datagram from source address 192.168.1.15, source port 500 to destination address 62.231.55.5 of secure gateway 306, destination port 500. The packet 310 is routed through the NAT router 302, which network address translates the packet by modifying the source address to the NAT router's 302 public IP address 83.71.137.134 and source port to X, resulting in the new packet 311. The packet 311 is routed via the Internet to the NAT-T proxy 304, where the packet is processed. The packet 311 is recognized as the start of a new NAT-T capable session by decision point 210, and a new NAT state-machine is created 214. The new NAT state-machine in this example translates the source address to 10.128.0.1 and source port 500 to form the new packet 313, which is sent by the packet process flow 226. The secure gateway 306 receives the packet 313, processes the packet and returns the ISAKMP message 314 "HDR, SA, VID", which is sent to the NAT-T proxy 304 assigned address 10.128.0.1 in the packet 315. The packet 315 is recognized at packet process flow decision point 210 as being the initial response to a session, after which the NAT state-machine is located 212. After packet modification 218, the packet 317 is sent to the NAT router, where it is network address translated into packet 318 and sent to the originating host 300.

The ISKMP messages 319 and 324 are processed in a similar way, being first translated by the NAT router 302 and then by the NAT-T proxy 304 and reverse translated on the outbound direction.

On receipt of ISAKMP message 324 by the host 300, the host 300 switches to encapsulated UDP mode, sending an ISAKMP message 329 in packet 330 on source port 4500 to the security gateway 306 on destination port 4500. The NAT router 302, locates the NAT state-machine based on the ISAKMP initiator cookie and responder cookie, and updates the NAT state-machine address translation variables. The packet 331 is then modified 218 and the network address translated packet 333 is sent 226 to the security gateway 306 on UDP source port 4500. The response ISAKMP message 334 flows outbound to the originating host 300 being network address translated by the NAT-T proxy 304 and NAT router respectively.

The host 300 and security gateway 306 continue the IKE exchange until the IPsec security associations are established, at which point ESP packets can be exchanged in accordance with IETF RFC 3948 "UDP Encapsulation of IPsec ESP Packets", A. Huttunen, et al., January 2005. For example, inbound UDP encapsulated ESP packet 359 in IP packet 360 from host 300 to security gateway 306, and outbound UDP encapsulated ESP packet 364 in IP packet 365.

The NAT state-machine will now be described further.

The above description describes how the NAT-T proxy 304 interposes itself between the host 300 and the secure gateway 306, modifying the packet in each direction. The session is tracked using a NAT state-machine, which is now described in detail.

FIG. 5 shows state variables 410 to 420 maintained by each NAT state-machine 400. The behavior of the NAT state-machine 400 can be described by way of states and state transitions as shown in FIG. 6.

The NAT-T proxy 304 initializes a pool of NAT state-machines 400, one for each available private IP address in the NAT-T proxy 304 address pool. The NAT IP address (naddr 415) is initialized to the unique IP address in the pool allocated to each NAT state-machine 400. The NAT state-machines 400 are then added to a free pool of NAT state-machines. After initialization, all the NAT state-machines 400 are now in a free state represented by 450 in FIG. 6.

Figure 6:
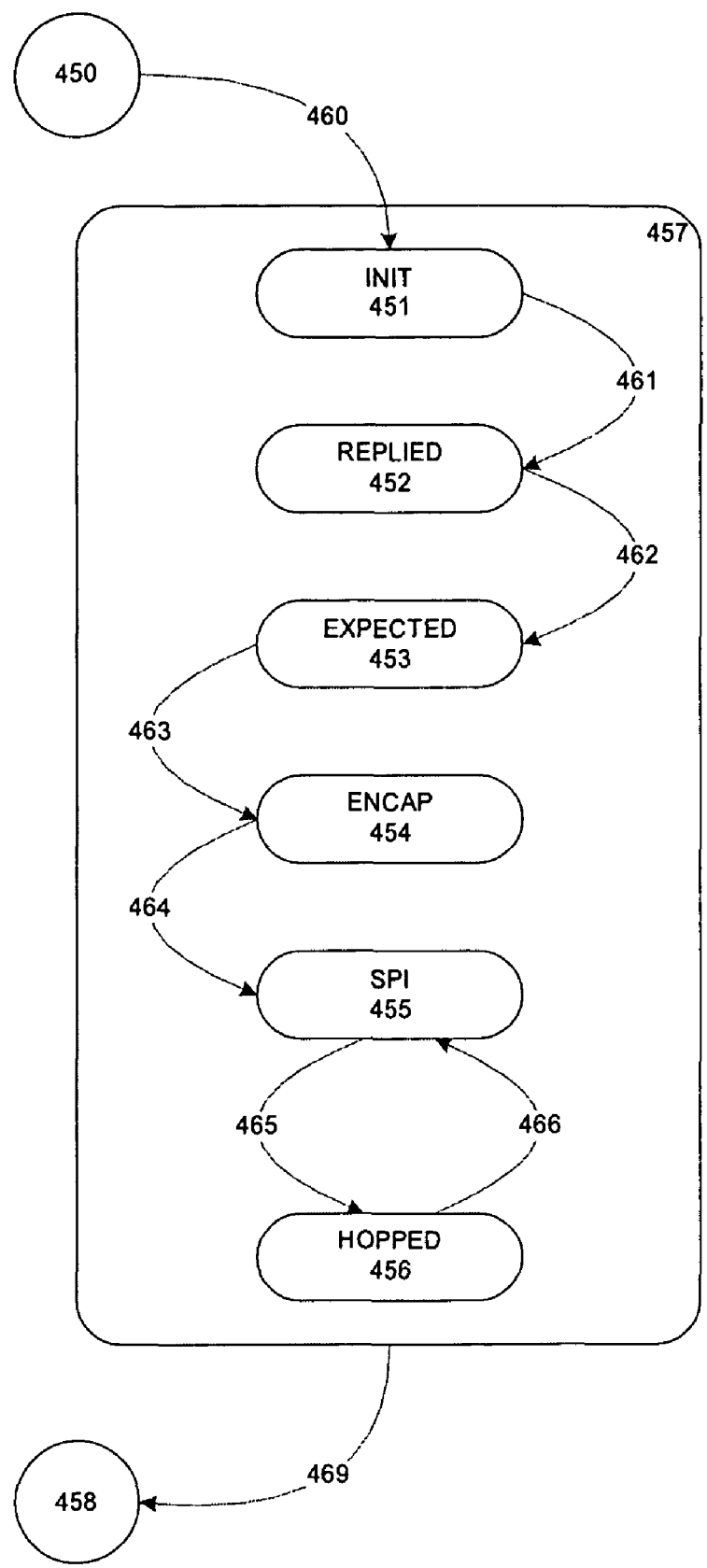
FIG. 6 shows a state transition diagram describing the behavior of NAT state-machines.

An inbound packet, recognized as a new NAT-T capable IKE session by decision point 210, is represented in FIG. 6 as transition 460, causing the NAT state-machine 400 to change state to NIT 451. NAT-T capability of the IKE session is determined by inspection of the ISAKMP Vendor IDs in the message as set forth in IETF RFC 3947 "Negotiation of NAT-Traversal in the IKE", T. Kivinen, et al., January 2005. As part of the state transition, the NAT state-machine is set up as follows: timer (t1 411) is started with value T1, timer counter (n 412) is set to value N1, client IP address (caddr 413) is set to the source IP address on the packet, client UDP port (cport 414) is set to the source UDP port on the packet, NAT IP address (naddr 415) is already set, NAT UDP port (nport 416) is set to 500 matching the packet's destination UDP port, IKE initiator cookie (icookie 417) is set to the initiator cookie from the ISAKMP message HDR, IKE responder cookie (rcookie 418) is set to 0 (zero), inbound ESP SPI (spi 419) and inbound ESP sequence number (seq 420) are both set to 0 (zero), and the I->R flag (toggle_i2r 421) is cleared.

The NAT state-machine 400 remains in the INIT 451 state until an outbound packet is received containing an ISAKMP message "HDR, SA, VID", for example message 314 in packet 315, sent as an IKE response, causing a NAT state-machine transition 461. The NAT state-machine 400 is updated as follows: IKE responder cookie (rcookie 418) is set to the responder cookie from the ISAKMP message HDR, new state REPLIED 452.

The NAT state-machine 400 remains in the REPLIED 452 state until an inbound packet is received containing an ISAKMP message "HDR, KE, . . . ", for example message 324 in packet 325, sent as an IKE response, causing a NAT state-machine transition 462. The NAT state machine 400 goes to a new state EXPECTED 453.

The NAT state-machine 400 remains in the EXPECTED 453 state until an inbound packet is received containing an ISAKMP message "HDR*#, IDii, . . . ", for example message 329 in the packet 330. The NAT state-machine 400 is located by the initiator cookie and responder cookie in the ISAKMP header HDR. The NAT state-machine 400 makes the transition 463 by setting the updated Client UDP port (cport 414) to the source UDP port on the packet, the NAT UDP port (nport 415) to 4500 matching the packet's destination UDP port, and the state 410 is changed to ENCAP 454.

The NAT state-machine 400 remains in the ENCAP 454 state until a first inbound UDP encapsulated ESP packet, for example 359 in packet 360, causing the NAT state-machine transition 464. The NAT state-machine 400 is updated as follows: inbound ESP SPI (spi 419) is set to the SPI in the UDP encapsulated ESP header defined in IETF RFC 2406 "IP Encapsulating Security Payload (ESP)", S. Kent, et al., November 1998., inbound ESP sequence number (seq 420) is set to the sequence number in the UDP encapsulated ESP header, timer (t1 411) is restarted, timer counter (n 412) is set to value N2, I->R flag (toggle_i2 r 421) is set, and the state (410) is changed to SPI 455.

The session is maintained by the NAT state-machine 400 in the state SPI 455 as long as there are ESP packets being exchange in both directions. The method employed by the preferred embodiment of the invention is by means of timer (t1 411), timer counter (n 412) and I->R flag (toggle_i2r 421). If a UDP encapsulated ESP packet is received inbound (I->R) and the I->R flag is set (toggle_i2r 421 is TRUE) or a UDP encapsulated ESP packet is received outbound (R->I) and the I->R flags is cleared (toggle_i2r is FALSE) then the timer (t1 411) is reset, the time counter (n 412) is set to N2 and the I->R flag (toggle_i2r 421) is toggled. By this method, ESP packets are required in alternate directions to prevent the session from timing out.

When an inbound UDP encapsulated ESP packet is successfully located during packet process step 212, the NAT state-machine 400 inbound ESP SPI (spi 419) and inbound ESP sequence number (seq 420) are updated with the packet ESP header SPI and sequence number respectively.

To support session resilience, if an inbound packet results in a second NAT state-machine 400, setting the Client IP address (caddr 413) and the Client UDP port (cport 414) to duplicate values (caddr 413 and cport 414) of a first NAT state-machine 400 in the state 410 SPI 465, then the first NAT state-machine 400 client IP address and port is deemed to have been hopped by the second NAT state-machine. The first NAT state-machine 400 makes the transition 465 to state HOPPED 456 and if timer counter (n 412) is greater than N3, then it (n 412) is reduced to N3.

While a NAT state-machine 400 is in the HOPPED 456 state outbound packets are dropped as the NAT state-machine 400 client IP address (caddr 413) and client port (cport 414) are no longer valid.

As a further measure to support changing client IP address and ports within a session, when an encapsulated ESP packet is received, with an ESP header SPI value equal to the NAT state-machine 400 stored inbound ESP SPI (spi 419), the ESP header sequence number is updated in the NAT state-machine 400 inbound ESP sequence number (seq 420). In the packet process flow, when locating a NAT state-machine (212), the packet source IP address and UDP source port are first used as a primary lookup method. If the packet is a UDP encapsulated ESP packet, and the ESP header SPI and sequence number do not match a first NAT state-machine 400, then a secondary lookup method to find a second NAT state-machine 400 based on SPI and sequence number match is performed. Where first and second NAT state-machines 400 are located, the second NAT state-machine 400, with matching SPI and sequence number, is selected in preference to the first NAT state-machine 400, and the first NAT state-machine is hopped (state transition 465 to the HOPPED 456 state).

A NAT state-machine 400 remains in the HOPPED 456 state until an inbound UDP encapsulated ESP packet has an ESP header SPI value matching the stored inbound ESP SPI (spi 419) and the packet has an ESP header sequence number within the windows (in accordance with IETF RFC 2406 "IP Encapsulating Security Payload (ESP)", S. Kent, et al., November 1998) of the stored inbound ESP sequence number (seq 420). Such an inbound UDP encapsulated ESP packet will cause the state transition 466 back to the state SPI 455, updating the client IP address (caddr 413) and port (cport 414) from packet source address and port respectively, restarting timer (t1 411) and setting timer counter (n 412) to value N2.

In any of the states INIT 451 to HOPPED 456, represented on FIG. 6 as 457, if the NAT state-machine 400 timer (t1 411) expires, the timer counter (n 412) is decremented. If, after decrementing, timer counter (n 412) reaches zero, the transition 469 is made resulting in the NAT state-machine terminating 458, and being returned to the free pool of NAT state-machines available for new sessions.

Issues relating to timer management will now be described. The NAT-T proxy 304 maintains NAT state-machines on a timer basis. The preferred embodiment utilizes a single timer period T1 for all timers making it possible to efficiently optimize timer management by ensuring that a started timer will expire on or after any existing timer. Anyone proficient in the art will recognize that imposing a constant T1 constraint on all timers makes it possible to maintain an expiry-time-ordered linear list of timers by a simple list-append operation. Timers can therefore be added and removed in an efficient manner.

When a NAT state-machine 400 enters the INIT 451 state via transition 460, timer (t1 411) is started and timer counter (n 412) is set to N1. The timer (t1 411) is not restarted again until the NAT state-machine makes the transition 464 into the state SPI 455. A remote client therefore has a period T1×N1 to establish an IPsec ESP tunnel.

While a NAT state-machine 400 is in the SPI 455 state, timer (t1 411) is restarted and timer counter (n 412) is set to N2 when UDP encapsulated ESP packets are exchanged in alternating directions. By this method, the NAT-T proxy 304 maintains session for a period T1×N2 of idleness in alternating directions.

When a NAT state-machine 400 transitions 465 into the HOPPED 456 state, the timer counter (n 412) is reduced to maximum value of N3 if greater, therefore entering the HOPPED 456 state will not extend the remaining lifetime a session, however it will shorten it to a maximum of T1×N3.

Suggested value for the NAT-T proxy 304 timer constants are: T1=5 minutes, N1=1, N2=14, N3=3 giving the behavior: INIT 451 to SPI 454 5 minutes, SPI 454 idle 70 minutes and HOPPED 456 maximum 15 minutes.

Embodiments of the invention must handle NAT Keepalives. IETF RFC 3948 "UDP Encapsulation of IPsec ESP Packets", A. Huttunen, et al., January 2005, section 4 defines a NAT keepalive procedure to keep NAT mapping alive for the duration of a session. FIG. 6 shows an example of NAT keepalive packets, both inbound (369) and outbound (374). The NAT-T proxy 304 supports the translation and sending of NAT Keepalive packets.

The NAT-T proxy 304 uses ESP packets as the primary means of maintaining sessions, however as a secondary mechanism, NAT keepalives are used to prevent the imminent removal of a NAT state machine 400 in state SPI 454 by restarting timer (t1 411) when time counter (n 412) is equal to 1. In this way, NAT keepalive will maintain the NAT state-machine 400 for a minimum period of T1.

Various strategies are used to locate NAT state-machines. In the packet process step 212, the NAT-T proxy 304 locates NAT state-machines 400. The NAT-T proxy 304 needs to support efficient mechanisms to locate NAT state-machines based on criteria:

1. assigned NAT IP address (naddr 415),
2. client IP address (caddr 413) and client port (cport 414),
3. IKE initiator cookie (icookie 417) and IKE responder cookie (rcookie 418), and
4. Inbound ESP SPI (spi 419).

To support efficient location strategies based on criteria 2 to 4, the NAT-T proxy 304 maintains three hash tables "client_htable", "expect_htable" and "spi_table", one for each criteria 2 to 4 respectively. NAT state-machine 400 entries are maintained in the hash tables enabling efficient location during packet process step 212. A NAT state-machine 400 entry is maintained in the "client_htable" in states INIT 451 to SPI 455. A NAT state-machine 400 entry is maintained in the "expect_htable" in state EXPECTED 453. A NAT state-machine 400 entry is maintained in the "spi_htable" in state SPI 455 and state HOPPED 456.

The efficiency of a hash table is critically dependent on the quality of the hash function. High-quality hash functions for IP address and port are widely available. The initiator cookie, responder cookie, and SPI values are effectively random therefore, the construction of a hash function is straightforward.

Definitions and Abbreviations

Network Address Translation (NAT): Translation of network addresses and other higher layer identifiers (such as UDP port) and related fields (such as checksum) in a datagram as a datagram traverses from one routing realm to another. In Basic NAT, datagram modifications are limited to network addresses and related fields (such as checksum). Network Address Port Translation (NAPT) is the specific case of NAT applicable to transport protocols such as TCP/UDP that carry a transport layer specific identifier for sessions. In NAPT, datagram modifications are made to network addresses and transport layer identifiers (TCP/USP ports) and related fields (such as checksum).

Hosts: PCs or other network devices connected to a network.

Router: a network device that routes datagrams (packets) from one connected network to another connected network.

Virtual Private Network: A private network constructed across a public network, such as the Internet. There are two types of VPN scenarios, the remote access scenario, and the lease-line replacement scenario. In the remote access scenarios, client's "dial-up" over secure tunnels to an access server, also known as a security gateway, which provides private network connectivity.

For the purposes of this document, the following abbreviations apply:

| | |
|---|---|
| ESP | Encapsulating Security Payload |
| IKE | The Internet Key Exchange protocol |
| IPsec: | IP Security, a set of protocols developed by the IETF to support secure exchange of packets at the IP layer. |
| IETF RFC | Internet Engineering Task Force Request for Comment |
| ISAKMP | Internet Security Association and Key Management Protocol |
| L2TP | Layer 2 Tunneling Protocol |
| NAT | Network Address Translation |
| NAPT | Network Address Port Translation |
| NAT-T | NAT-Traversal in IKE |
| TCP | Transmission Control Protocol |
| UDP | User Datagram Protocol |
| VPN | Virtual Private Network |

What is claimed is:

1. A method of network communication between a secure network and remote clients by way of an intermediate transport network, wherein the secure network is connected to the intermediate transport network through a security gateway and a NAT-T (Network Address Translation-Traversal) proxy is between the security gateway and the intermediate transport network, wherein a secure communication session is a NAT-T IKE (Internet Key Exchange protocol) session in which the type of session negotiated by NAT-T IKE between the secure network and remote clients is IPsec (IP Security), and in which initiator and responder cookies in an ISAKMP (Internet Security Association and Key Management Protocol) header of a packet are used to identify a packet as part of an established session, wherein the remote clients share a common source address on the intermediate transport network; and wherein in the NAT-T proxy, the method comprises:

a) analyzing packets received from a remote client to identify those packets that represent the start of a new secure communication session;

b) assigning a session-unique IP address to the new secure communication session to be established by the identified packet;

c) translating all packets in the secure communication session by exchanging their source address with the local session-unique IP address; and d) routing the translated packets to the security gateway whereby packets received by the security gateway have, for each established session, a unique IP address.

2. A network gateway device comprising a first network interface for communication with clients on a secure local network and a second network interface for communication with remote clients over a wide-area network, and a processing unit that can transfer data between the first and second network interfaces, wherein the processing unit is operative to transfer packets to implement a method according to claim 1.

3. A network gateway device according to claim 2 constituted by a general-purpose computer executing an operating system and suitable application software.

4. A computer software product stored on a non-transitory storage medium that when executed on a hardware platform performs a method according to claim 1.

5. A method of network communication between a secure network and remote clients by way of an intermediate transport network, wherein the secure network is connected to the intermediate transport network through a security gateway and a NAT-T (Network Address Translation-Traversal) proxy is between the security gateway and the intermediate transport network, wherein a secure communication session is a NAT-T IKE (Internet Key Exchange protocol) session in which the type of session between the secure network and remote clients is IPsec (IP Security) transport mode ESP (Encapsulating Security Payload), wherein the remote clients share a common source address on the intermediate transport network; and wherein in the NAT-T proxy, the method comprises:

a) analyzing packets received from a remote client to identify those packets that represent the start of a new secure communication session;

b) assigning a session-unique IP address to the new secure communication session to be established by the identified packet;

c) translating all packets in the secure communication session by exchanging their source address with the local session-unique IP address; and d) routing the translated packets to the security gateway whereby packets received by the security gateway have, for each established session, a unique IP address.

6. A method of network communication between a secure network and remote clients by way of an intermediate transport network, wherein the secure network is connected to the intermediate transport network through a security gateway and a NAT-T (Network Address Translation-Traversal) proxy is between the security gateway and the intermediate transport network, wherein a secure communication session is a NAT-T IKE (Internet Key Exchange protocol) session in which the type of session negotiated by NAT-T IKE between the secure network and remote clients is IPsec (IP Security) and in which the type of session between peers is L2TP (Layer 2 Tunneling Protocol) over IPsec transport mode ESP (Encapsulating Security Payload), wherein the remote clients share a common source address on the intermediate transport network; and wherein in the NAT-T proxy, the method comprises:

a) analyzing packets received from a remote client to identify those packets that represent the start of a new secure communication session;

b) assigning a session-unique IP address to the new secure communication session to be established by the identified packet;
c) translating all packets in the secure communication session by exchanging their source address with the local session-unique IP address; and
d) routing the translated packets to the security gateway whereby packets received by the security gateway have, for each established session, a unique IP address.

7. A method of network communication between a secure network and remote clients by way of an intermediate transport network, wherein the secure network is connected to the intermediate transport network through a security gateway and a NAT-T (Network Address Translation-Traversal) proxy is between the security gateway and the intermediate transport network, and the remote clients share a common source address on the intermediate transport network; wherein in the NAT-T proxy, the method comprises:
   a) analyzing packets received from a remote client to identify those packets that represent the start of a new secure communication session;
   b) assigning a session-unique IP address to the new secure communication session to be established by the identified packet;
   c) translating all packets in the secure communication session by exchanging their source address with the local session-unique IP address; and
   d) routing the translated packets to the security gateway whereby packets received by the security gateway have, for each established session, a unique IP address, and
   wherein sessions are maintained and terminated on a variable time basis.

8. A method of network communication between a secure network and remote clients by way of an intermediate transport network, wherein the secure network is connected to the intermediate transport network through a security gateway and a NAT-T (Network Address Translation-Traversal) proxy is between the security gateway and the intermediate transport network, and the remote clients share a common source address on the intermediate transport network; wherein in the NAT-T proxy, the method comprises:
   a) analyzing packets received from a remote client to identify those packets that represent the start of a new secure communication session;
   b) assigning a session-unique IP address to the new secure communication session to be established by the identified packet;
   c) translating all packets in the secure communication session by exchanging their source address with the local session-unique IP address; and
   d) routing the translated packets to the security gateway whereby packets received by the security gateway have, for each established session, a unique IP address, and
   wherein sessions are located using a multitude of strategies to deliver session resilience in the event of client IP address and port changes.

9. A method of network communication between a secure network and remote clients by way of an intermediate transport network, wherein the secure network is connected to the intermediate transport network through a security gateway and a NAT-T (Network Address Translation-Traversal) proxy is between the security gateway and the intermediate transport network, and the remote clients share a common source address on the intermediate transport network; wherein in the NAT-T proxy, the method comprises:
   a) analyzing packets received from a remote client to identify those packets that represent the start of a new secure communication session;
   b) assigning a session-unique IP address to the new secure communication session to be established by the identified packet;
   c) translating all packets in the secure communication session by exchanging their source address with the local session-unique IP address; and
   d) routing the translated packets to the security gateway whereby packets received by the security gateway have, for each established session, a unique IP address, and
   wherein a state machine is associated with a new session in order to monitor the state of the session.

* * * * *